United States Patent
Albers et al.

(10) Patent No.: US 8,471,704 B2
(45) Date of Patent: Jun. 25, 2013

(54) DOOR SYSTEM COMPRISING A SENSOR DEVICE FOR MONITORING VERTICAL DOOR EDGES

(75) Inventors: Bas Albers, Wadenswil (CH); Heinz Hügli, Bonaduz (CH); Beat De Coi, Sargans (CH); René Hug, Mels (CH); Thomas Gay, Malans (CH)

(73) Assignee: Cedes AG, Landquart (CH)

( * ) Notice: Subject to any disclaimer, the term of this patent is extended or adjusted under 35 U.S.C. 154(b) by 289 days.

(21) Appl. No.: 12/758,997

(22) Filed: Apr. 13, 2010

(65) Prior Publication Data

US 2011/0248850 A1  Oct. 13, 2011

(51) Int. Cl.
*G08B 13/08* (2006.01)
(52) U.S. Cl.
USPC .............. 340/545.1; 187/317; 340/545.6; 340/545.3; 340/547; 250/222.1
(58) Field of Classification Search
USPC .................................. 340/540–545; 250/221
See application file for complete search history.

(56) References Cited

U.S. PATENT DOCUMENTS

| | | | |
|---|---|---|---|
| 4,452,009 A | | 6/1984 | Baumeler et al. |
| 5,508,511 A | * | 4/1996 | Zur et al. ................... 250/222.1 |
| 6,218,940 B1 | | 4/2001 | Rejc et al. |
| 6,313,762 B1 | * | 11/2001 | Crowley et al. ................. 341/22 |
| 6,316,762 B1 | * | 11/2001 | Argast et al. ............. 250/214 R |
| 6,970,085 B2 | * | 11/2005 | Okabe et al. ................. 340/545.6 |
| 2002/0125077 A1 | * | 9/2002 | Shikai et al. .................. 187/317 |
| 2005/0265024 A1 | * | 12/2005 | Luk .............................. 362/231 |
| 2009/0230833 A1 | * | 9/2009 | Kao et al. ........................... 313/1 |

FOREIGN PATENT DOCUMENTS

| | | |
|---|---|---|
| CH | 653975 A5 | 1/1986 |
| DE | 44 15 401 C1 | 7/1995 |
| EP | 0 902 157 B1 | 3/2003 |
| EP | 1 375 808 A2 | 1/2004 |

\* cited by examiner

*Primary Examiner* — Daniel Wu
*Assistant Examiner* — Vishak Ganesh
(74) *Attorney, Agent, or Firm* — Burr & Brown

(57) ABSTRACT

A door system includes a sensor device for monitoring a vertical door edge. The sensor device has a transmitter that generates a light beam that runs along the vertical door edge, and a receiver to receive the light emitted by the transmitter. Further, an element of the sensor device is mounted in a region of a base of the door, with the sensor element being either in or on the base in front of the vertical door edge.

15 Claims, 3 Drawing Sheets

DOOR SYSTEM COMPRISING A SENSOR DEVICE FOR MONITORING VERTICAL DOOR EDGES

FIELD OF THE INVENTION

The invention relates to a door system comprising a sensor device for monitoring vertical door edges.

BACKGROUND OF THE INVENTION

The published European Patent Application EP 1 375 808 A2 discloses a sensor device for an automatic swivel door installation. The swivel door installation has a swivel leaf and a drive device and also a control device. A sensor serves to identify persons or objects in the range of movement of the swivel door leaf and comprises for this purpose a transmitting device for emitting light beams, a detector device for detecting light beams, and also a signal transmission device for transmitting the sensor signals to the control device.

The sensor is arranged with a plurality of sensor elements and a plurality of detector elements in the region of the vertical secondary closing edge of the swivel leaf in the upper region of the door. A light beam of the transmitting element runs close or at least virtually parallel to the vertical secondary closing edge of the door leaf.

A further device for monitoring motor-driven swivel leaf doors, the door leaves of which are equipped with a sensor strip fitted to the upper edge, is known from the German Patent Specification DE 44 15 401 C1. The sensor strip emits a beam cone directed toward the base.

SUMMARY OF THE INVENTION

The invention is based on the object of providing a door system for monitoring vertical door edges with which a higher monitoring reliability can be obtained.

The invention is based on a door system comprising a sensor device for monitoring vertical door edges, said sensor device comprising a transmitter and a receiver, the transmitter generating a light beam that runs along the vertical door edge, and the receiver receiving the light emitted by the transmitter. The door system is intended to concern all types of doors, including sliding doors, for example elevator doors, but also roller door systems, in which the lateral edges should be regarded as vertical closing edges. The system is also suitable for non-automatic door systems.

The heart of the invention resides in the fact that an element of the sensor device is mounted in the region of the base, preferably in or on the base in front of a vertical door edge.

It is also conceivable to arrange the element comparatively closely above the base, for example, at a distance of less than 15 cm, in one preferred embodiment at a distance of less than 5 cm. In the case of gates, this positioning should be achieved at least in the closed state of the gate. This makes it possible to construct a sensor device in such a way that light always runs from the transmitter to the receiver only via optical components which are associated with the system and coordinated with the system. In the case of conventional sensor systems, in the base region a customary surface is employed for the operation of the sensor system, said surface being found more or less arbitrarily by the system after incorporation. That is normally a conventional floor section. That makes the system susceptible to errors and inaccurate. By fitting an optical element of the sensor device in the base region, it is possible to create an optically defined path for light beams along a vertical door edge.

Furthermore, it is preferred if the sensor device is configured in such a way that the light emitted by the transmitter passes back to the receiver directly or at least via a separate optical reflector. In other words, either light passes without further reflections on a direct path from the transmitter to the receiver or at least one specific reflector is used which does not significantly attenuate the reflected light, this attenuation being, for example, not greater than 50%, more preferably less than 30%. The properties of the reflector are preferably known to the system, the system being adapted to the reflector.

As a result of this procedure, a receiver does not have to evaluate the light reflected from undefined objects, but rather can process the light which either comes directly from the transmitter or is reflected via the separate reflector with defined properties. The light that has passed back to the transmitter in this way has an intensity that is higher by a multiple than that of light reflected back from undefined surfaces, such as the base. Light signals that regularly also lie significantly above the level of disturbing ambient light or stray light are thus available at the receiver. As a result, a system thus also has a signal-to-noise ratio which has significantly better values in comparison with systems which operate by means of object reflections of the surroundings, for example, at base sections.

In this way, monitoring of this type becomes less susceptible to interference.

A door system can be used on both sides of the door, that is to say on the inside and on the outside.

Furthermore, it is preferred if a light path is embodied such that it is laterally offset with respect to a vertical door edge, in order to take into account, for example, mountings or door handles which project into the room.

If an object enters the light beams, the interruption is detected rather than, as, for example, in the case of EP 1 375 808 A2, even an increase in the light intensity, because the intruding object yields better reflection properties than the base, which reflects the light without detection in one case.

An interruption of a light beam can be detected unambiguously. Furthermore, this configuration has the advantage that a comparatively small "light cross section" can be employed for evaluation, as a result of which it is possible to achieve a significantly higher accuracy in the detection of objects. With a construction of this type, it is possible to realize an accuracy of less than 1 to 0.5 cm with regard to the detection of an object in a region to be monitored.

In a particularly preferred configuration, the transmitter and the receiver are arranged on opposite sides of a door edge. In the case of such an arrangement, without a reflector, the light is sent directly from the transmitter to the receiver. However, it is also conceivable for the transmitter and the receiver to be arranged on one side of the door edge and for the reflector to be provided on an opposite side.

It will then regularly be the case that at least one of the components is arranged on the door in a base region.

In this case, it has been found that, with regard to a surface being soiled or damaged, it is readily manageable, for example, to arrange a receiver or a reflector in the base in front of a door edge. As a result of the direct evaluation of a light beam, a certain soiling and/or scratching of the surface of a base part of the sensor device can even be accepted since the evaluated light then still has a sufficient intensity that is much greater than, in the case of the known embodiments, the light reflected from the base, for example.

A detection of small objects thus becomes possible, particularly if, for example, a plurality of transmitters are used, each of which generates a light beam. The light beams can be comparatively close together or have a comparatively small cross section. Correspondingly small objects can thus be detected if they interrupt a light beam. In contrast to the configuration in accordance with EP 1 375 808, a decision about whether an object lies in the detection region is determined not on the basis of an intensity value within a predefined intensity detection range, but rather by means of the detection that a beam is interrupted. This is regularly effected by virtue of the fact that light intensity values that lie below a still detectable threshold are present.

In this way, it is possible to detect smaller objects with considerably higher reliability.

By means of this procedure, depending on the configuration of the size of a beam cross section or the number of beams, it is possible to monitor regions smaller than 3 cm, preferably smaller than 1 or 0.5 cm. The regions are then separated from one another by less than 3 cm, preferably less than 1 or 0.5 cm, adjoin one another or even overlap one another. By way of example, a region of smaller than 10×10 cm is monitored by means of a plurality of light beams.

In the case where a plurality of comparatively "thin" light beams are used, even small objects completely cover a light beam and can therefore be detected unambiguously and reliably.

In this way, it is also possible to reliably detect small objects, such as children's fingers, for example, by means of light beams having a corresponding geometrical configuration. Depending on a requirement from the outside, for example, because specific edges lie in a detection zone of a plurality of light beams, preferably individual or a plurality of light beams can be masked out.

In order to detect light beams emitted by a plurality of transmitters, a plurality of receivers are preferably used. By way of example, each light beam is assigned a receiver.

Preferably, means are provided for masking out light beams before parts of the door systems bring about an undesired interruption. In this context, reference is made to the documents DE 44 15 401 C1 and EP 09 02 157 31, which describe solutions for masking out light beams.

For the case where light is passed via a separate reflector, a retroreflector is preferably used. Retroreflectors reflect incident light back substantially independently of the orientation of the reflector, largely in the direction of incident light.

Furthermore, it is preferred if the reflector reflects light back in a predefined pattern. In this way, it becomes possible to distinguish between light reflected from the reflector and stray light from the surroundings, if appropriate also light reflected from an object, which improves the reliability of the sensor device.

By way of example, a pattern of the reflector arises on account of different reflectances in the reflector zone. A pattern on the reflector can also be configured such that it is possible to identify whether light passes back to the receiver as a result of specular reflection, for example, at a pane of glass. In order to enable such an evaluation, the reflector should have no mirror symmetries. Moreover, the reflector orientation should be defined unambiguously with respect to the sensor. For this purpose, by way of example, a marking is provided on the reflector, which marking can be brought to a predefined relationship with respect to the receiver by the user during mounting.

Preferably, means are provided for being able to evaluate reflection patterns and/or multiple reflections or rereflections by means of the receiver.

Furthermore, an evaluation can be effected in respect of whether or not light originates from the reflector, on an evaluation of polarization properties of the light. Light that is reflected at a retroreflector, for example, is polarized. If the receiver is tuned only to a predefined polarization direction of the retroreflector, light having a different polarization property is left out of consideration. This ensures that only light which actually originates from the reflector and not from an object, for instance, is detected.

Transmitters, receivers and/or reflectors of the sensor device can be mounted, in principle, on moving parts, for example, a swivel door or a swivel leaf door. However, it is likewise possible also to fit onto stationary parts or to the base or to ceilings in the region of, for example, a door to be monitored.

In another preferred configuration of the invention, modulated light is emitted by one or by a plurality of transmitters, said modulated light being demodulated by a receiver. In this way, a differentiation between, for example, ambient light and light from a transmitter is again possible since ambient light does not have the corresponding modulation and is therefore not taken into further consideration during the demodulation. In this context, it is conceivable for, for example, the phase or the propagation time of the emitted light to be evaluated. Distances can be determined in this way. By way of example, for this purpose the light is pulsed or sine-modulated for a phase analysis.

In another preferred configuration of the invention, a plurality of receivers and/or transmitters are integrated in a housing, or even on a chip.

If one element of the sensor device is fixed, for example, to a movable part of the door, whereas a further element of the sensor device is stationary, it is preferred for an object evaluation to take place only when the elements of the sensor means can "see" one another.

By way of example, if the reflector is fixed to a swivel door and the transmitter and/or the receiver to a stationary wall, then a signal for object detection should be evaluated only when the reflector is situated in the beam path between the transmitter and the receiver. For this purpose, by way of example, a movement of a pattern generated by the reflector is detected, an object detection then no longer being effected if the pattern can no longer be detected by the receiver.

Moreover, provision can be made for activating the sensor device independently of the detection of a light beam. This is because it is possible for the case to occur in which, at the instant when all the elements of the sensor device can "see" one another but do not, for example, when the reflector is currently covered by an object, and so a detection of a light beam from the transmitter also cannot take place in order to initiate the mode of object detection. This is because the sensor means, in the case of this configuration, would still assume that the individual elements are not yet positioned with respect to one another in a manner such that identification of an object can be carried out. In order to increase the reliability during object detection, it is possible, in a learning pass, for example, to stipulate how much time is permitted to elapse maximally until the elements of the sensor means can at the latest "see" one another again if the door is in a normal movement sequence. Should the door deviate from a normal regular movement sequence, it is necessary for the sensor device to be driven accordingly by means of a control unit in this case.

BRIEF DESCRIPTION OF THE DRAWINGS

Two exemplary embodiments of the invention are illustrated in the drawings and are explained in greater detail below with further advantages and details being indicated.

DETAILED DESCRIPTION OF THE INVENTION

Figure 1:
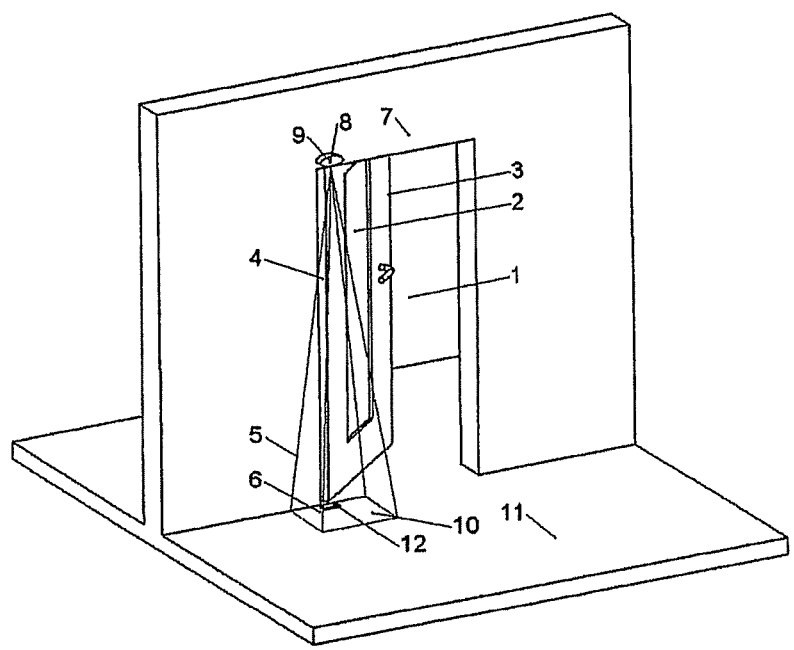
FIG. 1 shows the arrangement of a sensor device on a door in a perspective schematic illustration.

FIG. 1 illustrates a passage 1 with a door 2 in a schematic three-dimensional view. The door 2 has, for example, an automatic drive (not illustrated), by means of which the door opens automatically when a person approaches, and closes again after the person has passed.

The door has a vertical main closing edge 3 and also a secondary closing edge 4. In order to monitor the secondary closing edge 4, a light beam 5 is formed along said secondary closing edge by means of a sensor device 6. The sensor device 6 comprises a transmitter/receiver 9 mounted on a wall 7 in a lintel region 8 of the door 2. In a region 10 at a base 11 in front of the secondary closing edge 4 of the door 2, a reflector 12 is arranged on the base 11, said reflector being coordinated with the transmitter and receiver. In other words, the light beam 5 emitted by the transmitter impinges on the reflector 12 and is reflected back to the receiver 9, which lies directly alongside the transmitter. By means of the reflector, e.g. a retroreflector, a light beam passes back to the receiver 9 with a significantly higher intensity than if light merely backscattered from the base 11 were evaluated.

In principle, an element of the sensor device 6 which is mounted at the base 11 should be made as flat as possible in order to necessitate a smallest possible installation depth. An element of the sensor device which is provided for base mounting preferably comprises a housing with means for fitting on the base, for example, with an adhesive layer or mounting holes.

In order that a housing on the base acquires a flat configuration, it is furthermore preferred for the material of a housing for the element, for example, the transmitter/receiver and/or a reflector, to be configured such that it is as thin as possible. By way of example, no lenses are used for the receiver or transmitter element. Likewise, the housing should not have any lenses, in order thereby to avoid a curvature which is caused by lenses and which additionally requires space. Scratch-resistance material such as glass, polycarbonate or PMMA can be used as material for the housing and/or a "window" in the housing that is transparent to a transmitter and/or receiver or a reflector. The material should be transparent to the electromagnetic radiation used.

Figure 2:
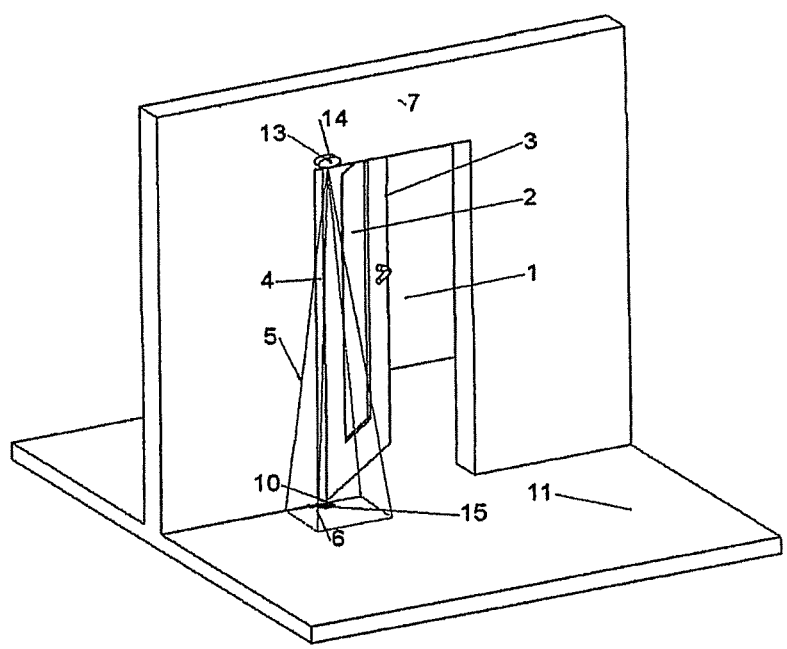
FIG. 2 shows a second embodiment of a sensor device arranged on a door in an illustration corresponding to that in FIG. 1.

In FIG. 2, the secondary closing edge 4 of the door 2 is likewise monitored. This embodiment makes use of a sensor device 13 wherein a transmitter 14 is arranged on the wall 7 in the lintel region 8 of the door and a receiver 15 is arranged on the base 11 in a region 10 in front of the secondary closing edge of the door.

The transmitter 14 generates light beams 5, which can be evaluated by, for example, three individual receivers at the location of the receiver receiving means 15.

Figure 3:
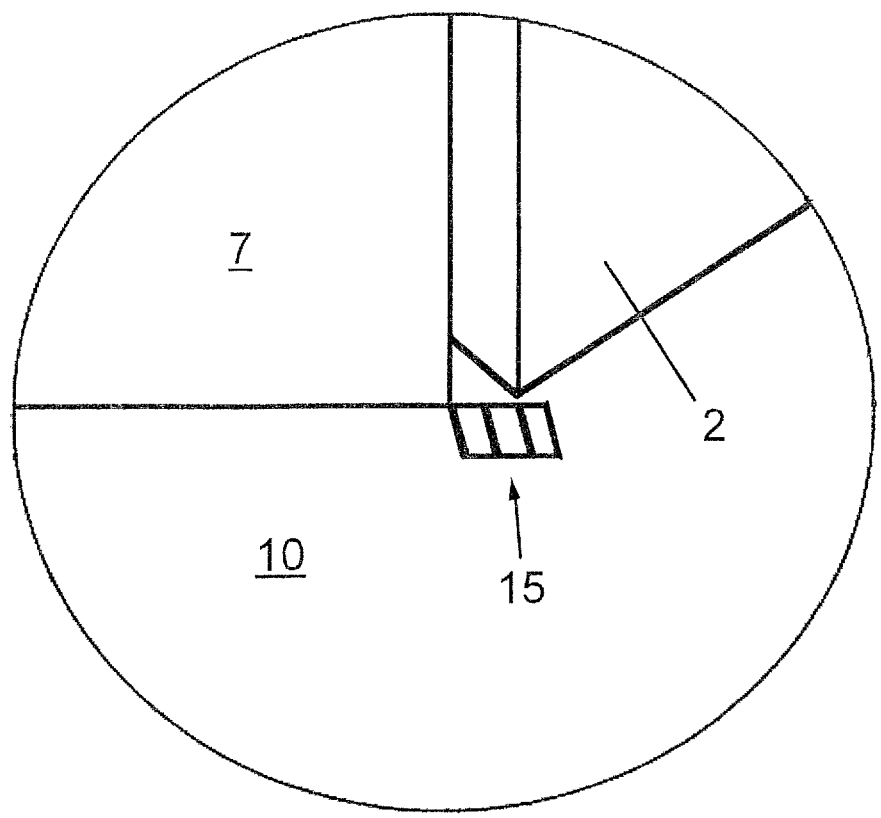
FIG. 3 shows an expended view of the sensor device having a plurality of receivers arranged in front of the secondary closing edge of a door.

Further, as shown in FIG. 3, the three receivers may be arranged in a base region below a hinged door, and by means of the three individual receivers, it is possible to achieve a comparatively high spatial resolution in a region in front of the secondary closing edge. Even comparatively small objects which pass into a monitoring region interrupt at least one connection to a receiver, which can lead to an intervention in the door movement. By way of example, if, when the door 2 is closing, one of the receivers no longer receives, an immediate reversing of the closing door is initiated.

By using a larger number of receivers, it is possible to achieve even finer monitoring. Monitoring accuracies of smaller than 0.5 cm are conceivable.

Conventional systems for monitoring secondary closing edges, for example, cannot come close to such accuracies on account of the evaluation of only scattered light from objects or a base.

| List of reference symbols | |
| --- | --- |
| 1 | Passage |
| 2 | Door |
| 3 | Main closing edge |
| 4 | Secondary closing edge |
| 5 | Light beam |
| 6 | Sensor device |
| 7 | Wall |
| 8 | Lintel region |
| 9 | Transmitter and receiver |
| 10 | Region |
| 11 | Base |
| 12 | Reflector |
| 13 | Sensor device |
| 14 | Transmitting means |
| 15 | Receiving means |

We claim:

1. A door system comprising a sensor device for monitoring vertical edges of a hinged door, the vertical edges including a primary closing edge and an opposed secondary closing edge arranged adjacent to a hinge that is mounted to a wall that supports the door, said sensor device comprising a transmitter that generates a light beam that runs along the secondary closing edge adjacent to the hinge, and a plurality of receivers that receive the light beam emitted by the transmitter, said sensor device being arranged in front of the secondary closing edge of the hinged door with the plurality of receivers being spaced at a distance of less than 3 cm from one another, whereby smaller objects are detected with increased accuracy and reliability in a region in front of the secondary closing edge.

2. The door system according to claim 1, wherein the light emitted by the transmitter passes back to the plurality of receivers directly.

3. The door system according to claim 1, wherein the transmitter and the plurality of receivers are arranged on opposite ends of the secondary closing edge.

4. The door system according to claim 1, wherein the transmitter and the plurality of receivers are arranged on one end of the secondary closing edge and a reflector is arranged on an opposite end thereof.

5. The door system according to claim 4, wherein the reflector is a retroreflector.

6. The door system according to claim 4, wherein the reflector provides a pattern in the reflected light.

7. The door system according to claim 1, wherein the plurality of receivers are arranged on a lowermost region of the door.

8. The door system according to claim 4, wherein the reflector has polarizer properties.

9. The door system according to claim 1, wherein the transmitter is arranged on a lowermost region of the door.

10. The door system according to claim 4, wherein the reflector is arranged on a lowermost region of the door.

11. The door system according to claim 1, wherein the transmitter generates a concentrated light beam.

12. The door system according to claim 1, wherein the transmitter modulates the light.

13. The door system according to claim 1, wherein the light emitted by the transmitter passes back to the plurality of receivers via an optical reflector.

14. The door system according to claim 1, wherein the sensor device has a detection accuracy of less than 1 cm in the region in front of the secondary closing edge of the door.

15. The door system according to claim 1, wherein the sensor device has a detection accuracy of less than 0.5 cm in the region in front of the secondary closing edge of the door.

* * * * *